(12) United States Patent  (10) Patent No.: US 8,518,235 B2
Volkel et al.  (45) Date of Patent: Aug. 27, 2013

(54) ALL-ELECTRIC COAGULANT GENERATION SYSTEM

(75) Inventors: Armin R. Volkel, Mountain View, CA (US); Meng H. Lean, Santa Clara, CA (US); Kai Melde, San Francisco, CA (US); Norine E. Chang, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 352 days.

(21) Appl. No.: 12/967,147

(22) Filed: Dec. 14, 2010

(65) Prior Publication Data

US 2012/0145546 A1  Jun. 14, 2012

(51) Int. Cl.
*C02F 1/463* (2006.01)
*C02F 1/469* (2006.01)
*C25B 1/26* (2006.01)

(52) U.S. Cl.
USPC ........... 205/742; 205/750; 205/761; 205/500; 204/267; 204/522; 204/633

(58) Field of Classification Search
USPC ................. 205/742, 750, 761, 500; 204/267, 204/522, 633
See application file for complete search history.

(56) References Cited

U.S. PATENT DOCUMENTS

| | | | |
|---|---|---|---|
| 8,268,169 B2 | 9/2012 | Lean et al. | |
| 2003/0070919 A1* | 4/2003 | Gilmore | 204/275.1 |
| 2008/0128331 A1 | 6/2008 | Lean et al. | |
| 2008/0230458 A1 | 9/2008 | Lean et al. | |
| 2009/0050538 A1 | 2/2009 | Lean et al. | |
| 2009/0114601 A1 | 5/2009 | Lean et al. | |
| 2009/0114607 A1 | 5/2009 | Lean et al. | |
| 2009/0283452 A1 | 11/2009 | Lean et al. | |
| 2009/0283455 A1 | 11/2009 | Lean et al. | |
| 2010/0072142 A1 | 3/2010 | Lean et al. | |
| 2010/0140092 A1 | 6/2010 | Volkel et al. | |
| 2010/0314263 A1 | 12/2010 | Lean et al. | |
| 2010/0314323 A1 | 12/2010 | Lean et al. | |
| 2010/0314325 A1 | 12/2010 | Lean et al. | |
| 2010/0314327 A1 | 12/2010 | Lean et al. | |
| 2012/0145647 A1 | 6/2012 | Volkel et al. | |
| 2012/0152855 A1 | 6/2012 | Lean et al. | |

* cited by examiner

*Primary Examiner* — Arun S Phasge
(74) *Attorney, Agent, or Firm* — Fay Sharpe LLP (57) ABSTRACT

A coagulation generating system that combines the advantages of conventional and electrocoagulation. In the coagulation generating system electro-coagulation is performed on an input (e.g., salt/brine) solution to generate a concentrated coagulant solution, which is then added to the source water in the same way as a standard stored chemical coagulant.

19 Claims, 6 Drawing Sheets

ALL-ELECTRIC COAGULANT GENERATION SYSTEM

BACKGROUND

In water treatment appropriate coagulants are used to improve the removal of many different contaminants. The coagulants initiating the aggregation of the contaminants to large enough particles for removal. A wide variety of coagulants exists, including aluminum salts, iron salts, natural or artificial polyelectrolytes, among others. The roles of the inorganic coagulants (e.g. $Fe^{3+}$, $Al^{3+}$) are to neutralize the screening of Coulomb repulsion between the contaminant particulates and/or facilitate the formation of insoluble hydroxide precipitates that serve as nucleation centers for aggregate growth. Both of these functions are highly sensitive to the pH of the source water as the charge on the contaminant particulates as well as the solubility of the hydroxides depends on it. Therefore, proper pH control of the source water is a consideration for efficient contaminant removal.

Conventionally, the inorganic coagulants are introduced into source water in the form of salts having low concentrations of the actual coagulant ions suspended therein. For example, $FeCl_3*6H_2O$ is a typical coagulant used with salt water, and which contains less than 21% iron by weight.

An alternative to conventional chemical coagulants is electrocoagulation (EC), a method for electrically generating coagulants. In EC the coagulant is produced in the source water directly by the electrochemical dissolution of a sacrificial electrode (e.g. Al, Fe) under an applied voltage. Despite being well known and having the advantage of producing coagulant from compact metal electrodes compared to the use of metal salts with low coagulant ion content, EC is not widely used in the water treatment industry. The lack of use of EC is due in part to the dependency of the electrochemical reactions on source water quality and applied voltage. Another issue is the need for a thorough and rapid mixing of the released coagulant ions into the bulk of the source water. Adjusting the coagulant dose for varying source water quality either requires a change of applied voltage (which can impact the electrochemical reactions occurring inside the EC cell) or a change in the flow rate through the cell (which will impact the mixing efficiency). High salinity liquids, such as sea water or some produced waters, are also challenging to treat with EC, because the high conductivity of these liquids causes a high dosing current even at low voltages, requiring a highly turbulent flow regime within the EC cell to achieve sufficient mixing. Therefore typical EC systems are highly adapted to a specific application with well-defined input waters and are hard to adjust to work for other needs.

INCORPORATION BY REFERENCE

The following co-pending and commonly assigned applications, the disclosures of each being totally incorporated herein by reference, are mentioned:

U.S. Published Application No. 2009/0050538, entitled, "Serpentine Structures for Continuous Flow Particle Separations", by Lean et al.;

U.S. Published Application No. 2008/0128331, entitled, "Particle Separation and Concentration System", by Lean et al.;

U.S. Published Application No. 2008/0230458, entitled, "Vortex Structure for High Throughput Continuous Flow Separation", by Lean et al.;

U.S. Published Application No. 2009/0114601, entitled, "Device and Method for Dynamic Processing in Water Purification", by Lean et al.;

U.S. Published Application No. 2009/0114607, entitled, "Fluidic Device and Method for Separation of Neutrally Buoyant Particles", by Lean et al., U.S. Published Application No. 2010/140092, entitled, "Flow De-Ionization Using Independently Controlled Voltages", by Armin R. Volkel et al.;

U.S. patent application Ser. No. 12/484,071, filed Jun. 12, 2009, entitled, "Method and Apparatus for Continuous Flow Membrane-Less Algae Dewatering", by Lean et al.;

U.S. Published Application No. 2009/0283455, entitled, "Fluidic Structures for Membraneless Particle Separation", by Lean et al.;

U.S. Published Application No. 2009/0283452, entitled "Method and Apparatus for Splitting Fluid Flow in a Membraneless Particle Separation System", by Lean et al.;

U.S. patent application Ser. No. 12/615,663, filed Nov. 10, 2009, entitled, "Desalination Using Supercritical Water and Spiral Separation", by Lean et al.

U.S. Published Application No. 2010/0072142, entitled, "Method and System for Seeding with Mature Floc to Accelerate Aggregation in a Water Treatment Process", by Lean et al.;

U.S. patent application Ser. No. 12/484,038, filed Jun. 12, 2009, entitled, "Stand-Alone Integrated Water Treatment System for Distributed Water Supply to Small Communities", by Lean et al.;

U.S. patent application Ser. No. 12/484,005, filed Jun. 12, 2009, entitled, "Spiral Mixer for Floc Conditioning", by Lean et al.;

U.S. patent application Ser. No. 12/484,058, filed Jun. 12, 2009, entitled, "Platform Technology for Industrial Separations", by Lean et al.;

U.S. patent application Ser. No. 12/967,172, filed Dec. 14, 2010, entitled, "Electrocoagulation System", by Volkel et al.;

U.S. patent application Ser. No. 12/973,083, filed Dec. 20, 2010, entitled, "Membrane Bioreactor (MBR) and Moving Bed Bioreactor (MBBR) Configurations for Wastewater Treatment", by Lean et al.; and U.S. patent application Ser. No. 12/972,684, filed Dec. 20, 2010, entitled, "System and Apparatus for Seawater Organics Removal", by Meng H. Lean et al.

BRIEF DESCRIPTION

A coagulation generating system that combines the advantages of conventional and electrocoagulation. In the coagulation generating system electro-coagulation is performed on an input (e.g., salt/brine) solution to generate a concentrated coagulant solution, which is then added to the source water in the same way as a standard stored chemical coagulant.

DETAILED DESCRIPTION

Figure 1:
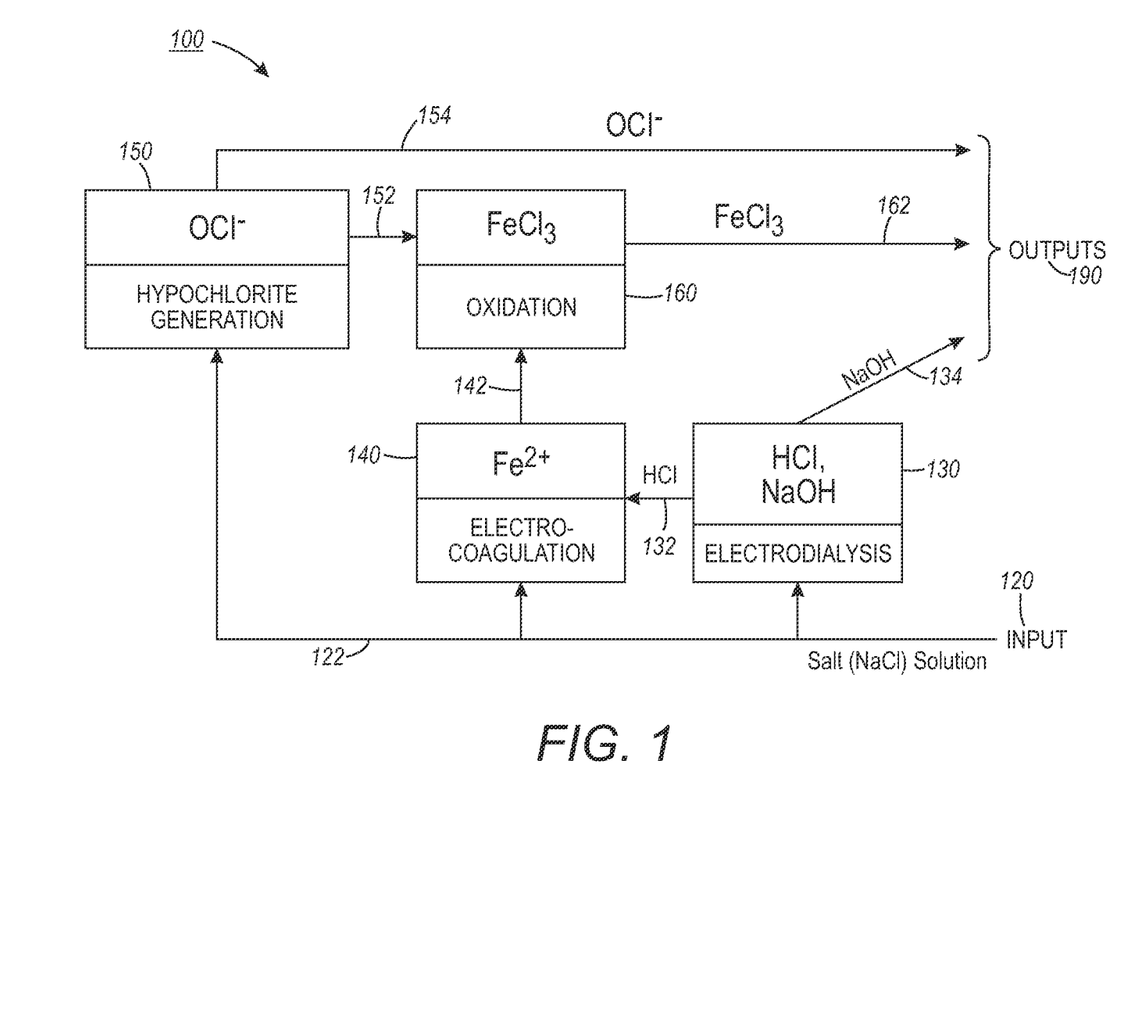
FIG. 1 is a schematic diagram of the generation of $FeCl_3$ coagulant using an all-electric process using only a salt/brine solution as input product.

With reference to FIG. 1, a schematic diagram of an all-electric coagulant generation system 100 for generating a coagulant solution such as but not limited to a $FeCl_3$ coagulant solution is shown. In the coagulant generation system 100, an input solution (e.g., salt water/brine) 120, carried on input line 122 is provided to electrodialysis (ED) cell 130, electrocoagulation (EC) cell 140, and hypochlorite generation cell 150. In the EC cell 140, the process for generating coagulants includes the release of metal ions from a sacrificial electrode (see FIG. 2). The metal ions released in EC cell 140 may require a low pH (e.g. pH<4.0 and in other alternatives approximately 2.0) in order for the metal ions to remain dissolved. The acid needed to maintain the low pH in EC cell 140 is provided by ED cell 130 (see FIG. 3) via line 132. For the generation of an iron based coagulant another step is required to oxidize the $Fe^{2+}$ ions released inside the EC cell to the final or concentrated coagulant $FeCl_3$. This is accomplished by oxidation cell 160 with the addition of hypochlorite ($OCl^-$), which is generated in the hypochlorite generation cell (OCl) 150 and is provided to oxidation cell 160, via line 152.

Figure 4:
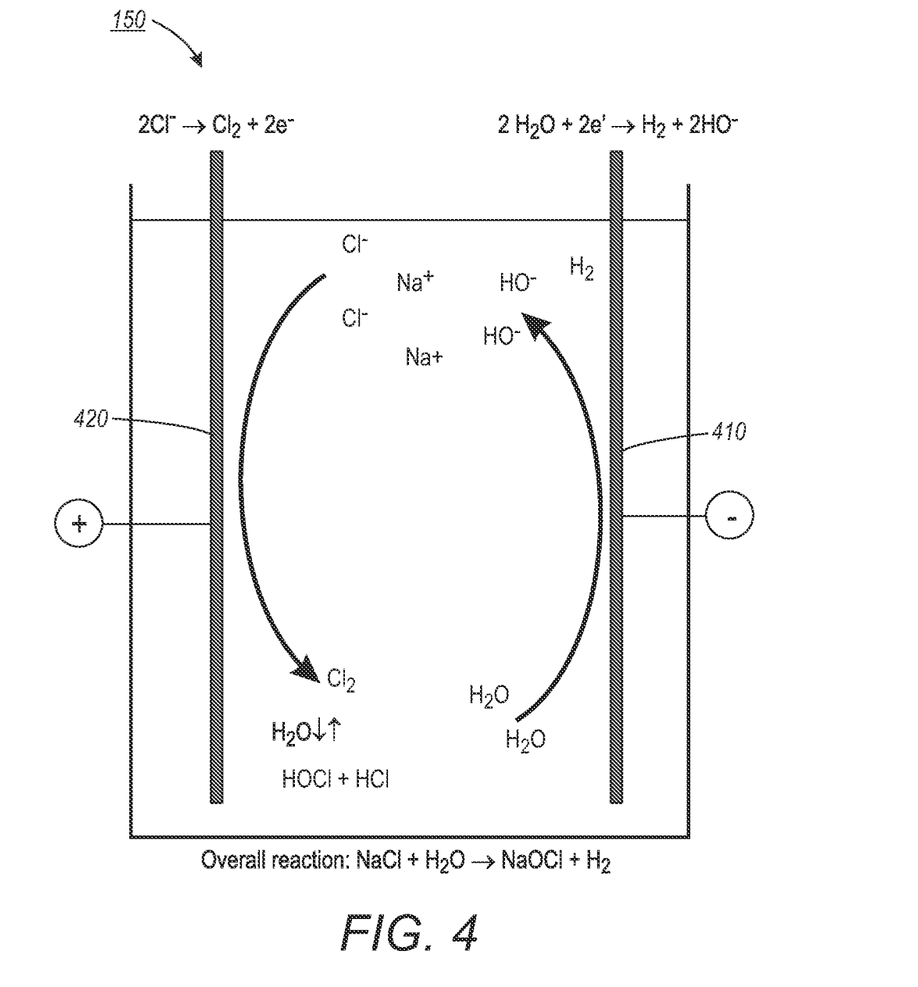
FIG. 4 is a schematic diagram of a hypochlorite generation system using passivated Titanium electrodes.

Hypochlorite is generated in OCl cell 150 with passivated titanium (Ti) electrodes (see FIG. 4). As for the iron case, pH adjustment is used to keep the $Al^{3+}$ ions in solution before they are added to source water (e.g., sea water) for coagulation. However, since Al is directly released as $Al^{3+}$ in EC cell 140, no oxidation step is needed. The final outputs 190 from coagulant generation system 100 are the coagulant $FeCl_3$ from oxidation cell 160, via line 162, the base NaOH from ED cell 130, via line 134 and any excess $OCl^-$ from the hypochlorite generation cell 150, via line 154. Thus, the present system is shown to generate at least $Fe^{3+}$ and $Al^{3+}$ coagulant.

Figure 2:
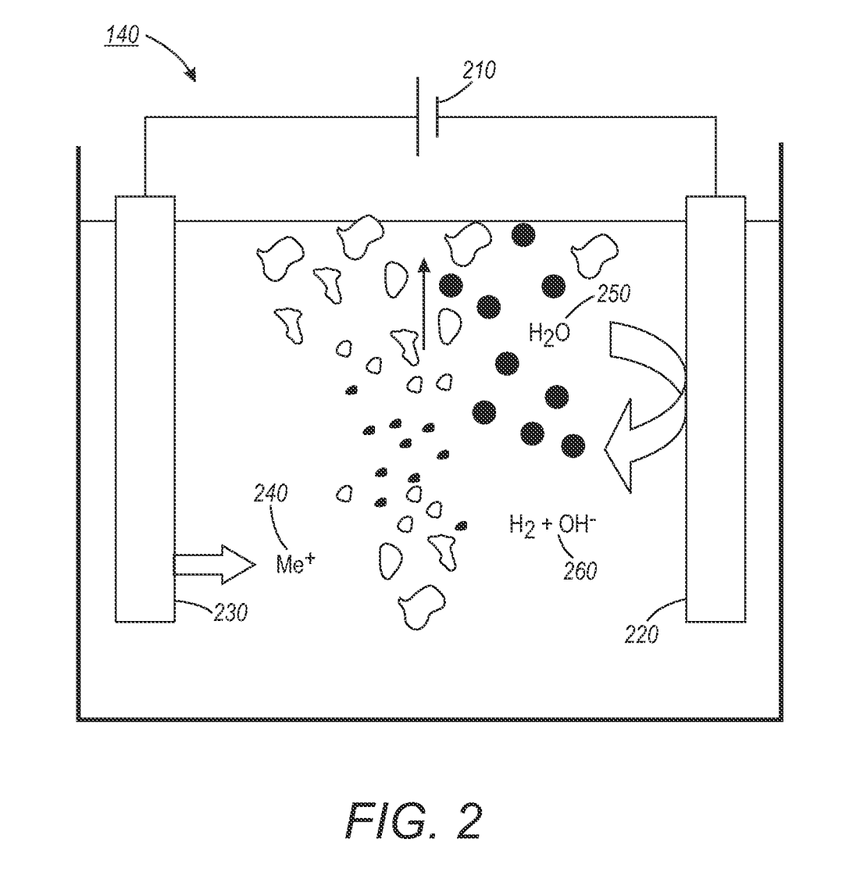
FIG. 2 is a schematic diagram of an electrocoagulation cell, in which metal ions are released from the anode and hydrogen gas is produced at the cathode.
Figure 3:
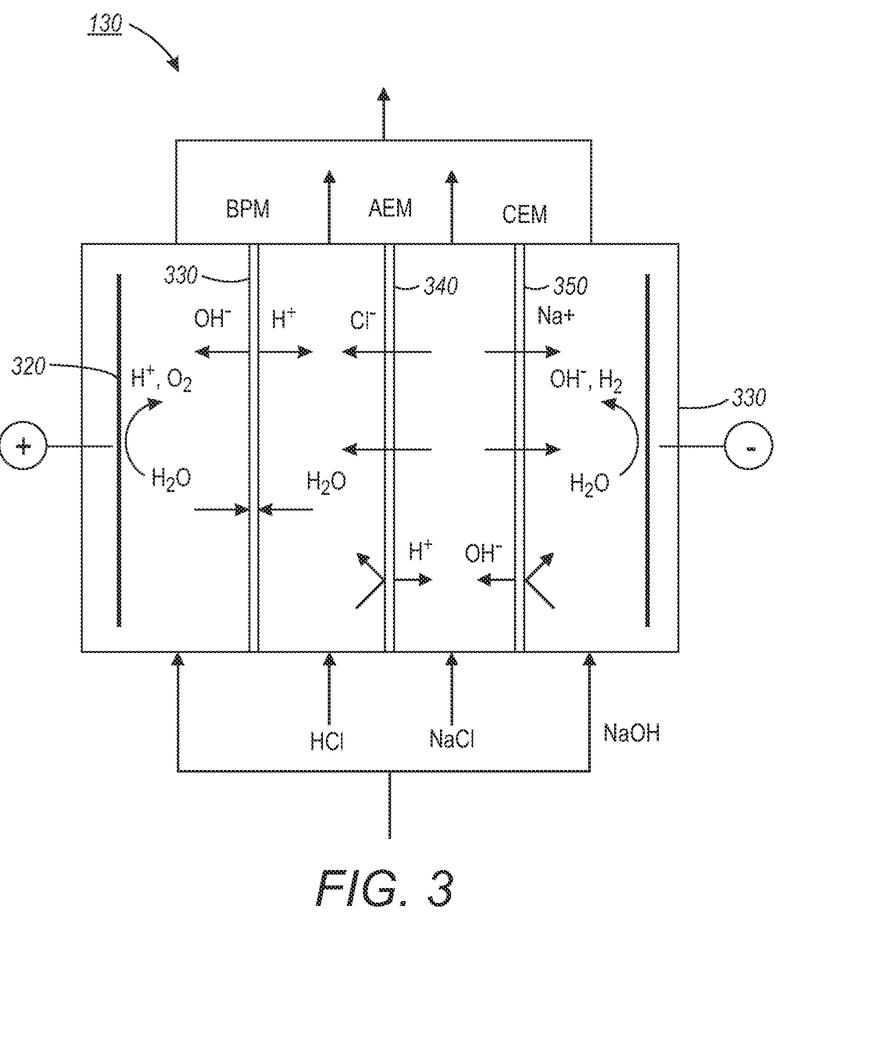
FIG. 3 is a schematic diagram of an electrodialysis cell for acid and base generation with a bipolar membrane next to the anode to prevent the formation of chlorine gas.

Turning to a more detailed discussion of the individual cells of system 100, attention is directed to FIGS. 2-4. With particular reference to FIG. 2 and continuing reference to FIG. 1, a power supply 210 is connected to a cathode electrode 220 and anode electrode 230 in electrocoagulation cell 140. Metal ions 240 of the coagulant are released from anode 230. At cathode 220 hydrogen gas 260 is produced. In the case of iron electrodes, $Fe^{2+}$ is released from the anode. $Fe^{2+}$ requires an acidic solution in order for the ions to remain dissolved. A simple acidic solution is insufficient, because of the $H_2$ generation at the cathode 220. Therefore, a constant acid supply is used to maintain the appropriate pH levels.

With reference to FIG. 3, a bi-polar membrane (BPM) 330, anion exchange membrane (AEM) 340, and cathode exchange membrane (CEM) 350 separate cathode electrode 310 and anode electrode 320 in electrodialysis (ED) cell 130. In ED cell 130, an applied electric field causes cations such as $Na^+$, $K^+$, etc. to migrate towards cathode 310, where they form the bases NaOH, KOH, etc. At the cathode excess protons are released as hydrogen gas $H_2$ in the cathodic reaction. Similarly, anions migrate toward anode 320, where they form acids. Chloride ions ($Cl^-$) are dominant in most natural brine solutions and will form chlorine gas ($Cl_2$) if allowed to contact anode 320. Therefore, an additional bi-polar membrane 330 next to anode 320 is provided to prevent the formation of chlorine gas. This leads to the formation of hydrochloric acid (HCl) between anion exchange membrane 340 and bi-polar membrane 330. Besides HCl other acids can also form such as $H_2SO_4$, $H_3PO_4$, etc. depending on the anion content of the source water.

With reference to FIG. 4, a cathode electrode 410 and anode electrode 420 of hypochlorite generating system 150 are shown. These are passivated Titanium (Ti) electrodes which generate hypochlorite for use in the oxidation cell. In addition to being an oxidant for the rapid conversion of ferrous ($Fe^{2+}$) to the ferric state ($FeCl_3$), hypochlorite may also be used as both a cleaning and sterilizing agent.

Figure 5:
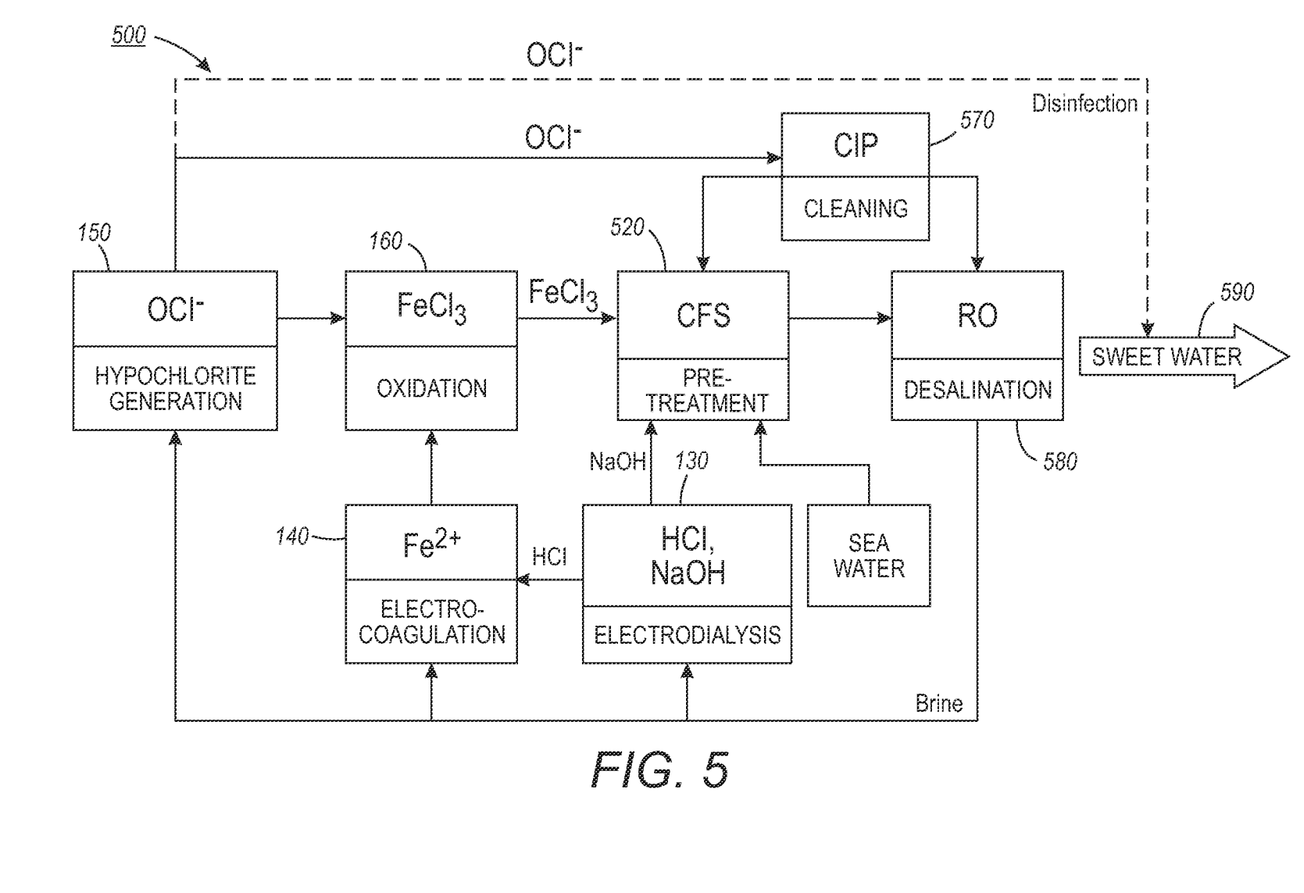
FIG. 5 is a schematic diagram of a complete $FeCl_3$ coagulant generation and dosing system embedded into a desalination treatment system in which the brine stream from the RO system can be directly used as input for the different electrochemical subsystems.

With reference to FIG. 5, coagulant generation system 100 is shown within a water treatment process train of a desalination system 500. The electrodialysis cell 130, electrocoagulation cell 140, oxidation cell 160, and hypochlorite generation cell 150 from the coagulation generation system 100 receive input solution (e.g., salt water/brine) from a reverse osmosis (RO) cell 580. In EC cell 140, the main coagulant is created when the metal ions are released from the sacrificial electrode. The metal ions released in the EC cell 140 may require a low pH (e.g. pH<4.0) in order for the metal ions to remain dissolved. The acid needed to maintain the low pH in the EC cell 140 is provided by an ED cell 130. For the generation of an iron based coagulant another step is required to oxidize the $Fe^{2+}$ ions released inside the EC cell to the final coagulant $FeCl_3$. This is accomplished in the oxidation cell 160 with the addition of hypochlorite ($OCl^-$), which is generated in the hypochlorite generation cell 150.

The coagulant ($FeCl_3$ in this example) from oxidation cell 160 is mixed with source water (e.g., sea water) 510 in coagulation flocculation sedimentation (CFS) cell 520, while the NaOH from ED cell 130 can be used to adjust the pH of the source water to a level which is optimal for the coagulation process. For good turbidity removal and achieving a low SDI (silt density index), which is done when pre-treating water for desalination or other membrane driven process, the coagulant ions are rapidly mixed and well dispersed into the source water at a pH of about 8.5 to allow for a homogeneous mixture of the coagulant ions to form in the water before the hydroxide precipitation advances too far. Pretreated water from CFS cell 520 is moved into RO cell 580. From RO cell 580 treated source water (e.g., sweet water) 590 is output for further processing or for a final intended use.

The brine output from RO cell 580 can be used as an input solution for the electrocoagulation generation processes. Particularly, the brine stream from the RO system 580 can be directly used as input for the different electrochemical subsystems, i.e. the ED cell 540, EC cell 550, and hypochlorite generation cell 560.

Any excess hypochlorite from hypochlorite generation cell 150 can be used with clean in place (CIP) system 570. The CIP system 570 can be used with at least CFS cell 520 and RO cell 580. It is understood CIP system 570 includes components and configurations that permit for the cleaning of at least the CFS cell 520 and RO cell 580, by operations such as back flushing of the systems and/or components making up these cells. It is also shown in FIG. 5 that output from OCl cell 150 is optionally provided to the treated water 590, for disinfection of the water.

Figure 6:
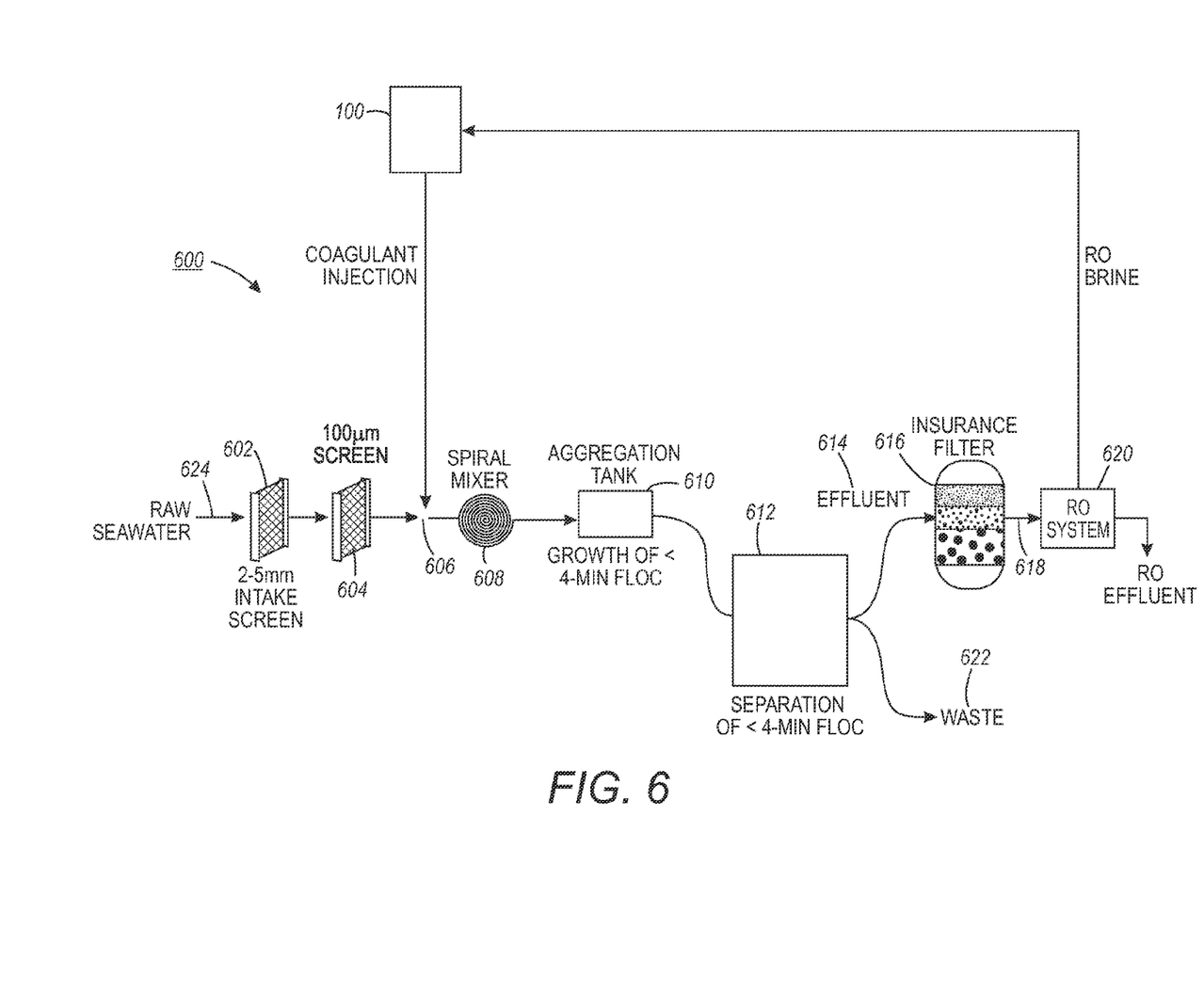
FIG. 6 is another view of a water treatment system incorporating the all-electric coagulation system of the present application.

Turning to FIG. 6, illustrated is a process schematic for raw seawater or brackish water treatment prior to reverse osmosis (RO) in a desalination configuration using coagulant generated by all-electric coagulation system 100. The RO membranes require very high quality feedwater to operate effectively.

System 600 includes a first input filter 602 which may be a 2-5 mm filter sized intake screen for filtering the raw seawater. Following filter 602, a second filter 604 is provided for further filtering and may be a 100 µm screen filter. The filtered water passes a coagulate injection system input 606 which injects coagulant generated by the all-electric coagulant generation system 100. Then the coagulant injected water stream is mixed in a spiral or other mixer-conditioner 608. The output of spiral mixer-conditioner 608 is then moved to an aggregation tank 610 where the aggregated particles are allowed to grow further such as for approximately 4 minutes for certain floc. The flow with the aggregates are then moved from the aggregation tank 610 to a separation device 612 which includes an effluent output 614 (where the aggregates have been removed by separator 612). Before entering the RO membranes the flow is further filtered by insurance filters 616. Then the flow is used as RO feed water 618 which is provided to a RO cell or system 620. The RO cell 620 generates RO effluent which may be further processed or used as a final product. Another output of RO cell 620, the RO brine, can be used in system 100 as explained in connection with FIG. 5. Water from a second output of separator 612 is provided as a waste stream 622, and contains the separated-out aggregates. The rate at which the raw seawater is input into system 600 may in one embodiment be controlled by a pump represented by arrow 624.

The separator 612 may be of various types, including a hydrodynamic separator such as taught in the material incorporated by reference herein, including but not limited to the teachings of U.S. Patent Publication Number 2009/0283455. These hydrodynamic separators include various formats including a spiral or curved or other forms. The separators may be stacked for parallel operation such that there are spiral stacks, planar curved arc segment stacks or other forms of stacked separators.

While the coagulant generation system 100 has been shown in FIG. 5 to be integrated into a water treatment system and FIG. 6 shows additional details to water treatment systems, it is understood that such a system as coagulant generation system 100 is designed to be incorporated into a variety of water treatment systems and other fluid treatment systems that would benefit from the addition of a coagulant solution, including but not limited to those disclosed in the material incorporated herein by reference.

Thus the described system and method combines the advantages of conventional coagulation and electrocoagulation. In one embodiment the described system and method electrocoagulation is performed on a salt/brine solution to generate the final or concentrated coagulant solution, which is then added to the source water in the same way as a standard stored chemical coagulant. One aspect of such system and method is the reduced need for transportation and storage of aggressive chemicals, with the added advantage that salty waste waters (e.g. the brine stream from a desalination plant) can be re-used in the electro chemical processes during coagulant generation. The desired coagulant can be generated on-demand and on-site using available raw materials and metal electrodes. The resulting coagulant fluid can then be dosed using conventional chemical dosing methods.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An electric based coagulant generation system for the treatment of water, the system comprising:
    an input operative to receive source water having particles therein;
    an input solution;
    an electrodialysis cell for creation of acids and bases from the input solution, and configured to separately output an acidic solution and a basic solution;
    an electrocoagulation cell for the generation of metal ions through a sacrificial electrode, the electrocoagulation cell configured to receive the acidic solution and the input solution and configured to output a coagulant solution;
    a hypochlorite generation cell for the generation of hypochlorite, the hypochlorite generation cell configured to receive the input solution and configured to output a hypochlorite solution; and
    an oxidation cell for the oxidation of metal ions, the oxidation cell configured to receive the hypochlorite solution and the coagulant solution and configured to output a final coagulant solution.

2. The system of claim 1 wherein the final coagulant solution is comprised of the coagulant solution oxidized by the hypochlorite solution.

3. The system of claim 1 wherein the input solution is brine.

4. The system of claim 1 wherein the input solution is the source water.

5. The system of claim 1, the electrodialysis cell includes a bipolar membrane between the anode and anion exchange membrane to prevent the formation of chlorine gas.

6. The system of claim 1 wherein the coagulant solution in the electrocoagulation cell has a pH of approximately 4.0 or below.

7. The system of claim 1, wherein the acidic solution is added to the electrocoagulation cell such that the pH of the coagulant solution is maintained at a preferential range below 2.0.

8. The system of claim 1, wherein the final coagulant solution and a basic solution are rapidly mixed and well dispersed at a pH of approximately 8.5 in a coagulation flocculation sedimentation cell with the source water.

9. An electric based coagulant generation system for treatment of water, the system comprising:
    an input operative to receive source water having particles therein;
    an input solution;
    an electrodialysis cell for the creation of acids and bases from the input solution;
    the electrodialysis cell comprising an anion exchange membrane positioned between an anode and a cathode, and a cathode exchange membrane positioned between the cathode and the anion exchange membrane;
    the electrodialysis cell outputting separately an acidic solution and a basic solution;
    an electrocoagulation cell for the generation of metal ions through the use of a sacrificial electrode;
    the sacrificial electrode comprising of an anode that releases metal ions and a cathode at which hydrogen gas is produced; and
    the electrocoagulation cell receiving the acidic solution and the input solution and outputting a final coagulant solution.

10. The system of claim 9 wherein the input solution is brine.

11. The system of claim 9 wherein the input solution is source water.

12. The system of claim 9 wherein the coagulant is $Fe^{3+}$.

13. The system of claim 9 wherein the coagulant is $Al^{3+}$.

14. The system of claim 9 the electrodialysis cell includes a bipolar membrane between the anode and anion exchange membrane to prevent the formation of chlorine gas.

15. The system of claim 9 wherein the coagulant solution in the electrocoagulation cell has a pH of approximately 4.0 or below.

16. The system of claim 9, wherein the acidic solution is added to the electrocoagulation cell such that the pH of the coagulant solution is maintained at a preferential range below 2.0.

17. The system of claim 9, wherein the final coagulant solution and a basic solution are rapidly mixed and well dispersed at a pH of approximately 8.5 in a coagulation flocculation sedimentation cell with the source water.

18. A method of generating a coagulant comprising:
    inputting an input solution to an electrodialysis cell, wherein the electrodialysis cell includes an anion exchange membrane positioned between an anode and a cathode, and a cathode exchange membrane positioned between the cathode and the anion exchange membrane;
    creating an acidic solution and a base solution from the input solution within the electrodialysis cell;
    separately outputting the acidic solution and the base solution from the electrodialysis cell;
    inputting into an electrocoagulation cell the acidic solution and the input solution wherein the electrocoagulation cell is configured to generate metal ions through the use of a sacrificial electrode;
    generating metal ions from the sacrificial electrode within the electrocoagulation cell having the acidic solution and the input solution, the sacrificial electrode including an anode that releases the metal ions and a cathode at which hydrogen gas is produced; and
    outputting a coagulant solution from the electrocoagulation cell.

19. The method of claim 18 further including:
    receiving the input solution into a hypochlorite generation cell;
    generating hypochlorite within the hypochlorite generation cell;
    outputting a hypochlorite solution from the hypochlorite generation cell;
    receiving the hypochlorite solution and the coagulant solution within an oxidation cell;
    oxidizing metal ions within the oxidation cell; and
    outputting a final coagulant solution from the oxidation cell.

* * * * *